United States Patent
Larsson et al.

(10) Patent No.: US 11,388,645 B2
(45) Date of Patent: Jul. 12, 2022

(54) NETWORK NODE AND METHOD FOR COMMUNICATING WITH A WIRELESS DEVICE USING CHANNEL QUALITY OF SCELL

(71) Applicant: TELEFONAKTIEBOLAGET LM ERICSSON (PUBL), Stockholm (SE)

(72) Inventors: Kjell Larsson, Luleå (SE); Maurice Bergeron, Québec (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/461,550

(22) PCT Filed: Dec. 12, 2016

(86) PCT No.: PCT/SE2016/051243
§ 371 (c)(1),
(2) Date: May 16, 2019

(87) PCT Pub. No.: WO2018/111158
PCT Pub. Date: Jun. 21, 2018

(65) Prior Publication Data
US 2019/0357108 A1 Nov. 21, 2019

(51) Int. Cl.
*H04W 36/30* (2009.01)
*H04W 16/32* (2009.01)
(Continued)

(52) U.S. Cl.
CPC .......... *H04W 36/30* (2013.01); *H04B 17/336* (2015.01); *H04L 1/0026* (2013.01);
(Continued)

(58) Field of Classification Search
CPC ..... H04L 5/0073; H04L 5/006; H04L 1/0026; H04W 74/0808; H04W 36/30; H04W 5/0057; H04W 72/085; H04B 17/345
(Continued)

(56) References Cited

U.S. PATENT DOCUMENTS

| 9,585,072 B1* | 2/2017 | Liu ................... H04W 36/0069 |
| 2011/0310753 A1* | 12/2011 | Chou .................... H04W 48/16 370/252 |

(Continued)

FOREIGN PATENT DOCUMENTS

| WO | 2004004140 A2 | 1/2004 |
| WO | 2016162045 A1 | 10/2016 |

OTHER PUBLICATIONS

International Search Report and Written Opinion dated Sep. 13, 2017 in related/corresponding International Application No. PCT/SE2016/051243.
(Continued)

Primary Examiner — Asad M Nawaz
Assistant Examiner — Jason A Harley
(74) Attorney, Agent, or Firm — Sage Patent Group (57) ABSTRACT

A network node and a method performed thereby for communicating with a wireless device are provided. The network node is operable in a first communication network, and provides a PCell in a licensed frequency band and a SCell in an unlicensed frequency band. The method comprises determining that a channel quality for the SCell does not meet a predetermined threshold; and when the channel quality for the SCell not meeting the predetermined threshold is due to interference from devices and/or nodes not belonging to the first communication network, triggering a channel switch of the SCell.

19 Claims, 5 Drawing Sheets

(51) Int. Cl.
*H04W 36/00* (2009.01)
*H04B 17/318* (2015.01)
*H04W 76/19* (2018.01)
*H04W 76/10* (2018.01)
*H04W 72/08* (2009.01)
*H04B 17/336* (2015.01)
*H04L 1/00* (2006.01)
*H04L 5/00* (2006.01)
*H04W 16/14* (2009.01)
*H04W 24/10* (2009.01)

(52) U.S. Cl.
CPC ............. *H04L 5/006* (2013.01); *H04W 16/14* (2013.01); *H04W 24/10* (2013.01)

(58) Field of Classification Search
USPC .................................. 455/421; 370/329, 331
See application file for complete search history.

(56) References Cited

U.S. PATENT DOCUMENTS

| | | |
|---|---|---|
| 2012/0281548 A1 | 11/2012 | Lin et al. |
| 2013/0315157 A1* | 11/2013 | Krishnamurthy ..... H04L 5/0048 370/329 |
| 2014/0010139 A1* | 1/2014 | Choi ..................... H04L 5/0053 370/312 |
| 2014/0329526 A1* | 11/2014 | Sundararajan ........ H04W 36/24 455/436 |
| 2015/0078261 A1* | 3/2015 | Yu .......................... H04L 5/0032 370/329 |
| 2015/0365831 A1* | 12/2015 | Ko ........................... H04L 5/001 370/329 |
| 2015/0382390 A1* | 12/2015 | Wong ..................... H04W 76/14 370/329 |
| 2016/0066195 A1* | 3/2016 | Moon .................... H04W 16/14 455/454 |
| 2016/0227416 A1* | 8/2016 | Suzuki ............... H04W 72/0453 |
| 2018/0103380 A1* | 4/2018 | Ode ....................... H04L 27/0006 |
| 2018/0123752 A1* | 5/2018 | De Benedittis ..... H04W 72/085 |
| 2019/0357108 A1* | 11/2019 | Larsson ............. H04W 36/0069 |

OTHER PUBLICATIONS

Office Action issued in corresponding EP Application No. 16819196.3 dated Jun. 19, 2020, 07 Pages. The references cited therein have previously been made of record.

* cited by examiner

NETWORK NODE AND METHOD FOR COMMUNICATING WITH A WIRELESS DEVICE USING CHANNEL QUALITY OF SCELL

TECHNICAL FIELD

The present disclosure relates to wireless communication and in particular to a network node and a method for communicating with a wireless device, wherein the network node provides resources in both a licensed spectrum and an unlicensed spectrum.

BACKGROUND

A large chunk of unlicensed spectrum exists in the 2 and 5 GHz spectrum, known to be used by WiFi. However, the spectrum is unlicensed and open for other technologies. In some markets, no requirements exist for Listen-Before-Talk, LBT, to be used. In those markets a duty cycle based transmission can be used, containing a transmission phase and a silent phase which allow technologies relying on LBT to transmit. The duty cycled based transmission can start to transmit when someone else is transmitting. To balance the load between different systems and technologies, a duty cycle based system can use a Carrier-Sensing Adaptive Transmission, CSAT, to adapt the channel usage. To adapt the channel usage, transmissions from other users and/or nodes over a given energy level can be used; which is the Energy Detection, ED. The duty cycle based approach is used by the first LTE versions, LTE-U, operating in the unlicensed spectrum.

Generally, network nodes try to determine which data rate to send with by some kind of feedback from the receiver. Such methods may be quality feedback, e.g. CQI, or that the network nodes probe which rate to be used. An example is Long Term Evolution, LTE, which uses CQI together with an outer loop. Another example is WiFi which generally uses probing with the only feedback of ACK if the transmission was successful.

If LBT is used, other more advanced methods may be used by users to reserve the channel by sending a reservation. WiFi does this with Clear-To-Send, CTS, but this method doesn't work well between different technologies, since the use of unlicensed spectrum can't force a technology to decode transmissions from other technologies.

When only one technology exists in a spectrum it can be designed to time-share the spectrum between users such as WiFi is doing or it can be designed to operate well in an environment with high interference such as WCDMA or LTE. Mixing the two may be somewhat problematic.

LTE is designed to operate with the same frequency in all cells. A cell is the coverage area of a network node. A network node may be associated with more than one cell. However, WiFi prefer to use a sparser frequency reuse since it wants as few strong interferes as possible to get less users to time share the channel with.

In LTE-U only the downlink is transmitted on the carrier (s) in the unlicensed spectrum while both uplink and downlink are transmitted on the carrier(s) in the licensed spectrum. The downlink on the carrier(s) in the unlicensed spectrum is called Secondary Cell, SCell, and works as it is carrier aggregated with the downlink on the carrier in the licensed spectrum, Primary Cell, PCell.

A risk exists that a new transmission starts when another node already is transmitting. This may result in much higher interference than expected based on the assumed channel quality. The collision results in an increased risk for failed transmissions. To lower this risk, algorithms such as CSAT will lower the channel usage when other users are active (this may also result in a fairer sharing between users and/or technologies, but having a little lower total channel usage also lowers the collision risk), but collisions may still occur. The problem with collisions may also occur from interference sources that are too weak to be above ED at the network node and in this case the CSAT algorithm will not help to free up resources on the channel.

Having strong interference to the receiver that can't be managed in a good way may cause non-optimal performance in the communication network. In many situations both the wireless device detecting the interference and the network node (and its communication devices) causing the interference will suffer.

WiFi nodes and LTE-U nodes are not necessarily always co-located. Several WiFi networks might operate in the same area and may be deployed with different purpose and they are not deployed jointly between the owners thereof. The LTE-U network might also be planned to get full coverage on PCell, but SCell which operates on a higher frequency has worse coverage and have higher restrictions on maximum allowed transmission power.

Different nodes in the system may or may not share dynamic frequency allocation on the unlicensed spectrum. And nodes may be added or removed at any time, making frequency planning difficult.

Also in wireless systems the use of different nodes varies over time, hence which frequencies that are most and/or least busy changes over time. Hence, which channel which has least interference is changing over time.

SUMMARY

The object is to obviate at least some of the problems outlined above. In particular, it is an object to provide a network node and a method performed thereby for communicating with a wireless device. These objects and others may be obtained by providing a network node and a method performed by a network node according to the independent claims attached below.

According to an aspect, a method performed by a network node for communicating with a wireless device is provided. The network node is operable in a first communication network, supports carrier aggregation, and provides a PCell in a licensed frequency band and a SCell in an unlicensed frequency band. The method comprises determining that a channel quality for the SCell does not meet a predetermined threshold; and when the channel quality for the SCell not meeting the predetermined threshold is due to interference from devices or nodes not belonging to the first communication network, triggering a channel switch of the SCell.

According to an aspect, a network node for communicating with a wireless device is provided. The network node is operable in a first communication network, supports carrier aggregation, and provides a PCell in a licensed frequency band and a SCell in an unlicensed frequency band. The network node is configured for determining that a channel quality for the SCell does not meet a predetermined threshold; and when the channel quality for the SCell not meeting the predetermined threshold is due to interference from devices or nodes not belonging to the first communication network, triggering a channel switch of the SCell.

The network node and the method performed by the network node have several advantages. One possible advantage is that interference may be avoided or reduced. Another possible advantage is that throughput may be increased. Higher throughput may enable new services or shorten the completion time. Still another possible advantage is that a more aggressive MCS may be used, wherein less overhead is needed in order to successfully transmit on the channel of the SCell. A further advantage due to less overhead and shorter completion time is that the system may switch to low power mode for longer time and save energy. A further possible advantage is that the other wireless devices directly or indirectly causing the interference situation may experience less interference themselves as the frequency (channel) is changed for communication between the network node and wireless device. Additionally, since bad interference situation may be detected and resolved or at least lessened, it is not only the performance that may be improved for the use of mixed technologies on unlicensed spectrum, but also the ability to co-exist. This further makes it easier manage the systems where no common deployment or frequency planning exist.

BRIEF DESCRIPTION OF DRAWINGS

Embodiments will now be described in more detail in relation to the accompanying drawings, in which.

DETAILED DESCRIPTION

Briefly described, a network node and a method performed thereby are provided for communicating with a wireless device. The network node supports carrier aggregation, wherein the network node provides a Primary Cell, PCell, in a licensed frequency band and a Secondary Cell, SCell, in an unlicensed frequency band. In this disclosure, a PCell may also be referred to as a primary carrier and a SCell may be referred to as a secondary carrier. By detecting bad channel quality associated with a channel of the SCell, the network node may take action in order to overcome or alleviate the problem of bad channel quality. The bad channel quality may be due to different causes, wherein the network node may take actions in case actions could possibly overcome or alleviate the problem of bad channel quality.

Embodiments herein relate to a method performed by a network node for communicating a wireless device. The network node is operable in a first communication network, supports carrier aggregation, and provides a PCell in a licensed frequency band and a SCell in an unlicensed frequency band.

Figure 1A:
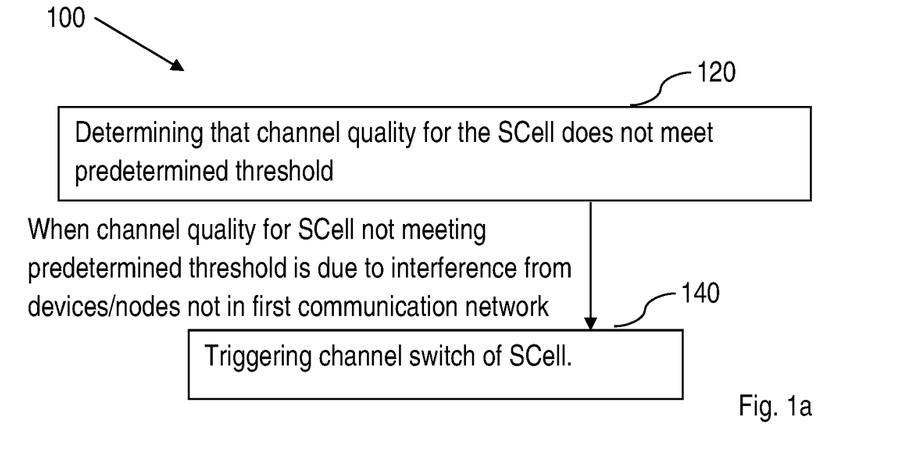
FIG. 1a is a flowchart of a method performed by a network node for communicating a wireless device, according to an exemplifying embodiment.

Embodiments of such a method will now be described with reference to FIGS. 1a-1e. FIG. 1a illustrates the method comprising determining 120 that a channel quality for the SCell does not meet a predetermined threshold; and when the channel quality for the SCell not meeting the predetermined threshold is due to interference from devices or nodes not belonging to the first communication network, triggering 140 a channel switch of the SCell.

The network node is communicating with the wireless device by means of the PCell (primary carrier) and at least one SCell (secondary carrier). Generally, control signalling is always transmitted on the PCell and downlink data may be transmitted on both the PCell and the SCell(s). The unlicensed frequency band may be e.g. in the 2 GHz and/or the 5 GHz spectrum, thereby competing with e.g. WiFi. In the licensed spectrum, also referred to as licensed frequency band, the communication network may be in more control of possible interference due to other transmissions in the area performed by any network node on the same channel or frequency should be belonging to the first communication system. A network node may be associated with one or more cells being a coverage area of the network node. However, in the unlicensed spectrum, many other wireless devices and/or communication devices may generate a lot of traffic in the form of transmissions to and from those other wireless devices and/or communication devices. These transmissions may cause interference in the SCell to transmissions between the network node and the wireless device over the SCell. The interference may thus affect the channel quality for the SCell, which will lower the throughput users experience.

The network node may thus e.g. compare a current channel quality for the SCell to the predetermined threshold in order to determine whether the channel quality for the SCell meets the predetermined threshold or not. In the case that the current channel quality for the SCell does not meet the predetermined threshold, the transmissions over the channel of the SCell will not meet the desired performance. However, the poor channel quality may be due to interference or it may be due to other causes, which will be explained in more detail below.

There are two types of interference. A first type is caused by nodes and/or devices of the first communication network, which network may also be referred to as the wireless device's own communication network. The other, second, type of interference is caused be nodes and/or devices not belonging to the first communication network, but instead one or more other communication networks. When the poor channel quality is due to interference on the SCell caused by devices and/or nodes belonging to other communication network(s), the network node triggers the channel switch of the SCell. Another channel of the SCell, or another SCell, may be less influenced by interference as it generally employs another frequency. Consequently, by switching channel of the SCell, or changing the current (old) SCell to another (new) SCell, the network node may overcome the relatively high interference on the old channel of the SCell that was previously used before switching to the new channel of the SCell or the new SCell itself.

The method performed by the network node has several advantages. One possible advantage is that interference may be avoided or reduced. Another possible advantage is that throughput may be increased. Higher throughput may enable new services or shorten the completion time. Still another possible advantage is that a more aggressive MCS may be used, wherein less overhead is needed in order to successfully transmit on the channel of the SCell. A further advantage due to less overhead and shorter completion time is that the system may switch to low power mode for longer time and save energy. A further possible advantage is that the other wireless devices directly or indirectly causing the interference situation may experience less interference themselves as the frequency (channel) is changed for communication between the network node and wireless device. Additionally, since bad interference situation may be detected and resolved or at least lessened, it is not only the performance that may be improved for the use of mixed technologies on unlicensed spectrum, but also the ability to co-exist. This further makes it easier manage the systems where no common deployment or frequency planning exist.

Figure 1B:
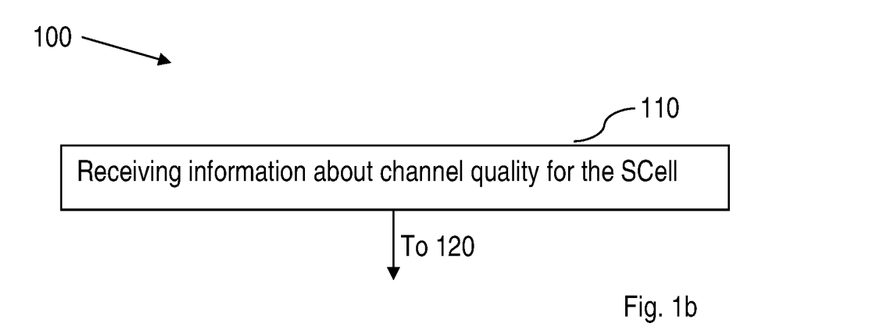
FIG. 1b is a flowchart of a method performed by a network node for communicating a wireless device, according to yet an exemplifying embodiment.

The method may further comprise, as illustrated in FIG. 1b, receiving 110 information about channel quality for the channel of the SCell from the wireless device.

There are different ways for the network node to obtain information about the channel quality for the channel of the SCell. In one example, the network node may send reference signal(s)/symbol(s) and/or pilot signal(s) to the wireless device. The wireless device may perform various measurements on reference signal(s)/symbol(s), pilot signal(s) and/or data signal(s) and report the measurement results to the network node.

By receiving e.g. measurement reports comprising results of one or more various measurements, the network node obtains information about channel quality for the channel of the SCell from the wireless device.

The information about channel quality for the channel of the SCell may comprise a Channel Quality Indicator, CQI, for the channel of the SCell.

Either both the wireless device and the network node, or one of them, may perform various measurements on transmissions between them. For example, the wireless device may perform measurements on signals and/or transmissions received from the network node. In case the communication network is based on Long Term Evolution, LTE, there are two types of CQI report in LTE: periodic and aperiodic. The periodic CQI report is carried by the Physical Uplink Control Channel, PUCCH. But if the wireless device needs to send uplink data in the same subframe as the scheduled periodic CQI report, the periodic CQI report will use the Physical Uplink Shared Channel PUSCH, together with uplink data transmission. This is because a wireless device can't transmit on both PUCCH and PUSCH simultaneously. In this case, the periodic PUCCH resource will be idle. Since periodic CQI report brings in the "always on" signalling overhead, the report granularity is relatively rough. In order to get more detailed or frequent CQI report, the network node may trigger aperiodic CQI report when needed. The aperiodic CQI report is transmitted on PUSCH, together with UL data or alone.

Figure 1C:
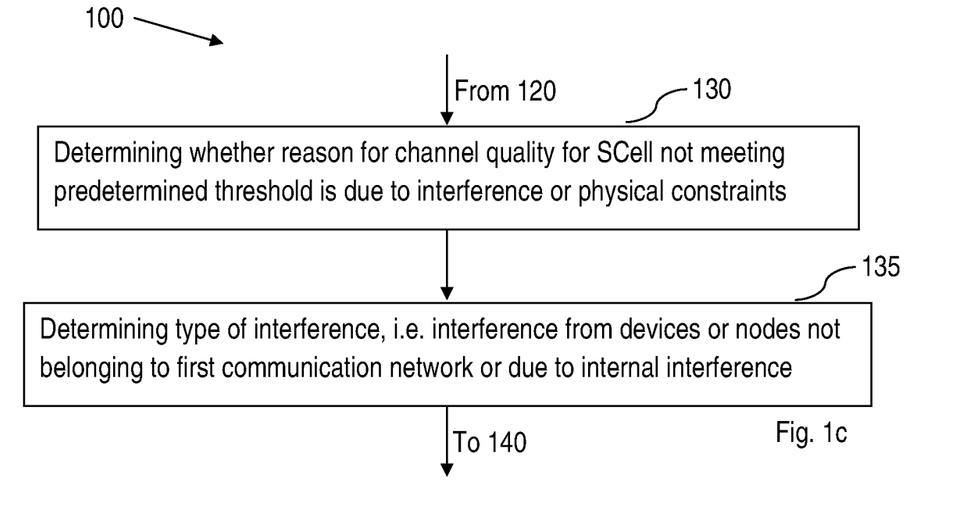
FIG. 1c is a flowchart of a method performed by a network node for communicating a wireless device, according to still an exemplifying embodiment.

The method may further comprise determining 130 whether the reason for the channel quality for the channel of the SCell not meeting the predetermined threshold is due to interference or physical constraints.

In order to determine what possible action to take due to the channel of the SCell not meeting the predetermined threshold, the network node may need to know the reason for the channel quality for the channel of the SCell not meeting the predetermined threshold. Depending on the reason, the network node may be able to take some action in order to alleviate the interference situation.

For example, if the reason for the channel quality for the channel of the SCell not meeting the predetermined threshold is due to physical constraints, not much can be done by the network node. However, if the reason for the channel quality for the channel of the SCell not meeting the predetermined threshold is due to interference, the network node may alleviate the interference situation by changing the channel of the SCell, or changing the SCell, wherein the network node and the wireless device may use another frequency (channel or SCell) for transmissions between them, wherein the other frequency may be less affected by those ongoing transmissions that caused the interference on the previous used frequency/channel/SCell.

Physical constraints may be associated with poor radio coverage.

When it comes to physical constraints, an example is poor radio coverage. The wireless device may be located close to a cell edge wherein the channel/radio conditions (radio coverage) generally are worse than closer to the network node. It is more likely that the SCell will suffer from bad coverage than the PCell, since the SCell uses higher frequencies and often has higher regulations on maximum transmission power. Further, there may be an obstacle in line of sight between the network node and the wireless device adversely affecting the radio coverage or channel/radio conditions. Such physical constraints may not be alleviated by the network node.

The method 100 may further comprise, as illustrated in FIG. 1c, determining 135 the type of interference, i.e. whether the channel quality for the channel of the SCell not meeting the predetermined threshold is due to interference from devices or nodes not belonging to the first communication network or due to internal interference.

As briefly described above, there are two types of interference. The first type is caused by nodes and/or devices of the first communication network, which network may also be referred to as the wireless device's own communication network. The other, second, type of interference is caused be nodes and/or devices not belonging to the first communication network, but instead one or more other communication networks. When it comes to the first type, there may be little or no gain by changing the channel and/or SCell since the nodes and/or devices will still be there and still have the same activity regarding transmission.

However, for the second type, the network node (of the first communication network) probably has little or no knowledge of network nodes and/or devices of other communication network(s), wherein a change of channel and/or SCell may improve channel conditions and/or quality. Consequently, by determining 135 the type of interference, the network node may take different action(s) depending on the type of interference.

The determining 135 of the type of interference comprises calculating the geometry for the PCell or SCell(s) and converting it to a channel quality which is compared to the received information about channel quality for the channel of the SCell.

Geometry information associated with the PCell or the SCell is example of how the network node may obtain information about the type of interference that may be causing poor channel quality on the channel of the SCell, whereby the channel quality does not meet the predetermined threshold. A geometry value reflecting a ratio between signal strength of own cell of the network node and the sum of signal strengths of neighbouring cells belonging to own or other network nodes using the same frequency or channel. Also the noise floor level may be included to better reflect what quality that can be expected by the wireless device. The geometry ratio can be seen as what quality that can be achieved if all neighbouring cells using the channel fully, and the receiver does not manage to suppress the interference. Hence the geometry can be seen as a quality measurement that can be used for comparison with the reported SCell quality.

The signal strength used to calculate the geometry can be Reference Signal Received Power, RSRP. The wireless device may receive reference signals from own and surrounding cells, belonging to own or other network nodes. The wireless device may further perform measurements of how strong these received reference signals are. All cells are transmitting reference symbols. By reporting the performed measurements, the network node obtains information about the situation for the wireless device.

In an example, the PCell(s) or SCell(s) used to calculate the geometry is limited to cells associated with neighbouring network nodes supporting or having an activated SCell on the same SCell-frequency as the network node performing the method.

Different SCells may employ different frequencies and hence do not interfere with each other; some network nodes might not even support SCells. Therefore, the relevant neighbouring cells for PCell and SCell when calculating geometry can differ. Generally, two cells employing the same frequencies may interfere with each other and two cells using different frequencies generally do not interfere with each other. Consequently, the network node may calculate geometry values based on the own cell and other cells belonging to network nodes within the first communication system supporting or having an activated SCell on the same SCell-frequency as the own SCell is operating on. The ones not having an active SCell on the same channel as own cells SCell can be omitted.

The determining 135 of the type of interference comprises comparing the channel quality for the SCell to a channel quality of the PCell.

There are different ways of determining that the type of interference is of the first type or the second type. For example, the network node may compare CQI between the channel of the PCell and the channel of the SCell. A much larger CQI on the PCell than on the SCell indicates that the channel of the SCell is associated with interference of the second type, i.e. caused by nodes and/or devices not belonging to the first communication network. This interference may be alleviated by changing or switching channel of the SCell as described above.

The determining 135 of the type of interference may comprise comparing the channel quality for the channel of the SCell to an estimated channel quality based on what can be achieved based on a Reference Signal Received Power, RSRP, if no interference exists, associated with the SCell.

The RSRP is one example of a parameter to use for determining 135 of the type of interference. The RSRP may be used in this case because the Signal to Noise Ratio, SNR, can be estimated based on the RSRP and the noise floor, which in turn may be compared to the CQI of the SCell. The wireless device may receive reference signals from own and surrounding cells, belonging to own or other network nodes (cells). The wireless device may further perform measurements of how strong these received reference signals are. All "cells" (i.e. network nodes) are transmitting reference symbols. By reporting the performed measurements, the network node obtains information about the situation for the wireless device.

Based on the measurement reports on RSRP, the network node may estimate what CQI should be achievable if no interference exists. The network node may then compare e.g. the achievable CQI on the channel of the SCell if no interference exists to the actual reported CQI for the channel of the SCell. If they differ to a certain extent, the network node may determine that the channel of the SCell is a victim of interference of the second type (actually also interference from first communication system will be considered as the second type here) and the network node may then trigger switching of the channel of the SCell in an attempt to alleviate the interference.

The determining 135 of the type of interference may comprise estimating a pathloss for the channel of the SCell and estimating an achievable CQI if no interference exists and comparing it to the channel quality of the SCell.

The pathloss is another parameter that may be used for determining 132 of the type of interference. The pathloss may be estimated in different ways. For example, based on reported measured RSRP associated with different network nodes and cells and channels thereof together with information about transmitted power.

Once the network has estimated the achievable CQI if no interference exists, the network node may compare this estimated CQI to the actual reported CQI for the channel of the SCell. If they differ to a certain extent, the network node may determine that the channel of the SCell is a victim of interference of the second type and the network node may then trigger switching of channel of the SCell in an attempt to alleviate the interference.

Figure 1D:
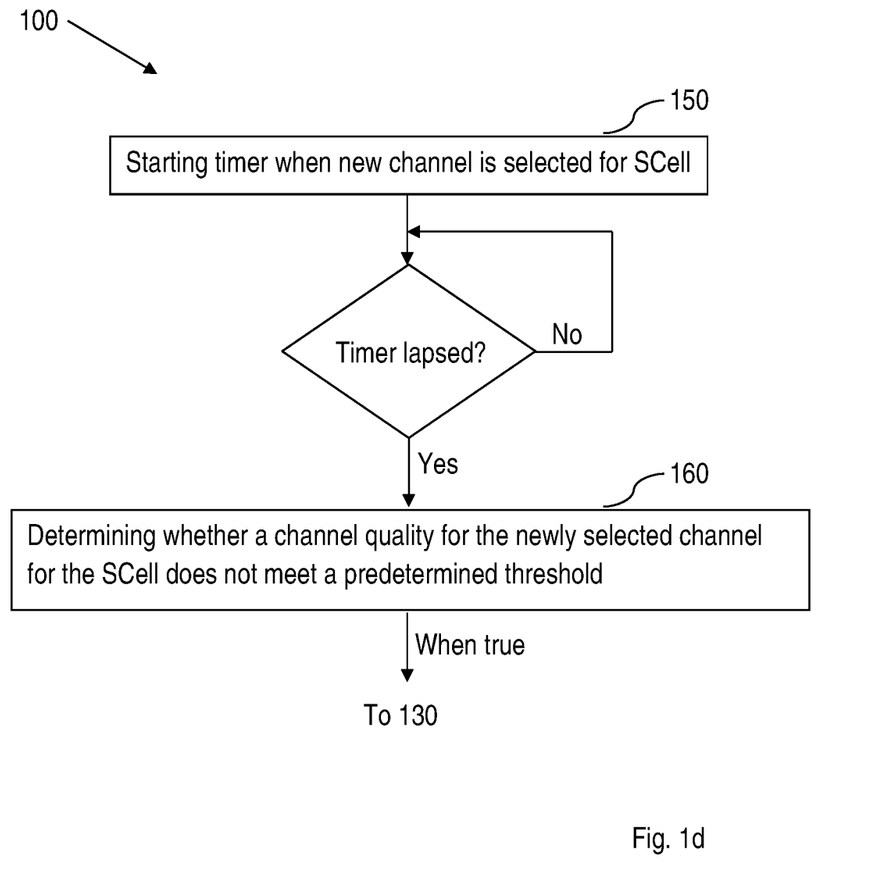
FIG. 1d is a flowchart of a method performed by a network node for communicating a wireless device, according to another exemplifying embodiment.

The method may further comprise starting 150 a timer when a new channel is selected for the SCell, and when the timer lapses, determining (160) whether a channel quality for the newly selected channel for the SCell does not meet a predetermined threshold.

In order to prevent a possible scenario in which the network node quickly triggers and performs channel switch of the channel of the SCell, the network node may start the timer when the new channel, e.g. a new channel within the SCell or a new SCell, is switched to.

Merely as an illustrative example, assume the network node triggers and performs a channel switch of the SCell from a first channel to a second channel of the SCell; and starts the timer. The network node immediately determines that the channel quality for the newly selected channel (second channel) for the SCell does not meet a predetermined threshold. However, the network node may not take any action as long as the timer is running. This is to prevent a frequent channel switching. Once the timer has lapsed, the network node may trigger the channel switch of the SCell if it still determines that the channel quality for the newly selected channel (second channel) for the SCell does not meet a predetermined threshold.

There may be more than one timer and there may be restrictions going back and forth between two channels (or SCells) and other restrictions on going between three or more different channels (or SCells).

Figure 1E:
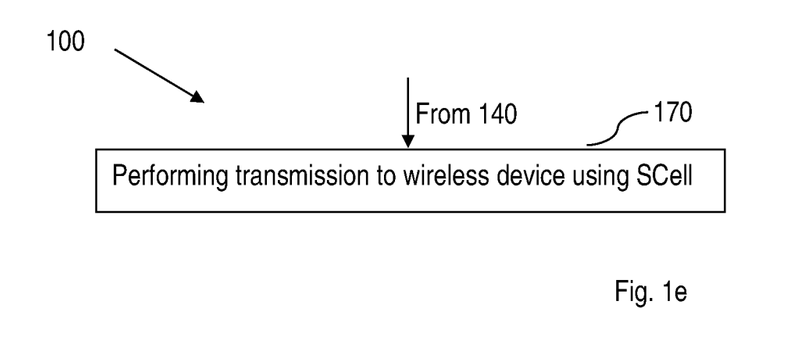
FIG. 1e is a flowchart of a method performed by a network node for communicating a wireless device, according to a further exemplifying embodiment.

Still further, the method may comprise performing 170 a transmission to the wireless device using the channel of the SCell.

Once the network node has data to transmit to the wireless device on the SCell, the network node may perform the transmission to the wireless device using the channel of the SCell. The channel of the SCell may be a "new" channel that the network node has switched to in case it has previously determined that channel quality for the "old" channel of the SCell did not meet the predetermined threshold.

Figure 2:
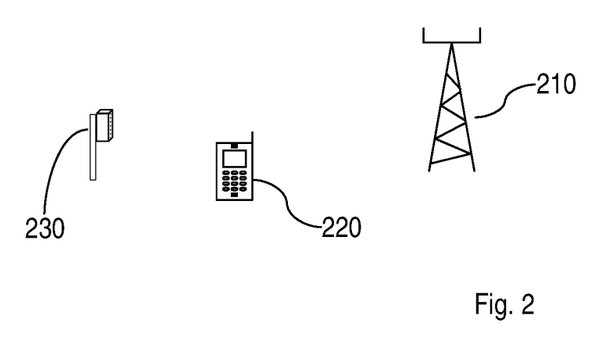
FIG. 2 is a schematic illustration of a wireless device being served by a network node in a licensed frequency band and in an un-licensed frequency band.

FIG. 2 is a schematic illustration of a wireless device 220 being served by a network node 210 in a licensed frequency band and in an unlicensed frequency band. The unlicensed frequency band may be ones used by WiFi, wherein there may be one or more access points 230 for WiFi and a plurality of communication devices (not shown) that may cause interference on the unlicensed frequency band.

Dependent on locations of network nodes 210 and 230 there is a risk that SCell of the network node 210 (e.g. an LTE-U eNodeB) to the wireless device 220 has very bad channel quality (e.g. CQI) even when the LTE-U node 210 is near the WiFi node 230 and has backed off from the channel usage to leave space for the other users, e.g. WiFi, and that the LTE-U transmission is detected over Energy Detection threshold by the WiFi. The reason is that LTE-U doesn't use LBT. Rather low activity on WiFi may result in few collisions, but when WiFi is heavily loaded, the collisions probability will be very high and might impact channel quality estimation.

When the WiFi STA/AP 230 is a hidden node for the network node 210 of LTE-U and most likely the LTE-U node is under ED (energy detection) for WiFi; hence LBT will not prevent new transmissions and interfering transmissions might take place during the entire LTE transmission This probably means high interference and bad CQI since the wireless device 220 may even receive stronger signal from the interferer 230 than from the LTE-U network node 210. This case also applies to unlicensed versions of LTE operating with LBT.

Further, bad CQI by itself does not need to be the result of interference, it can be limited by the noise floor, i.e. there is not sufficient coverage.

Figure 3:
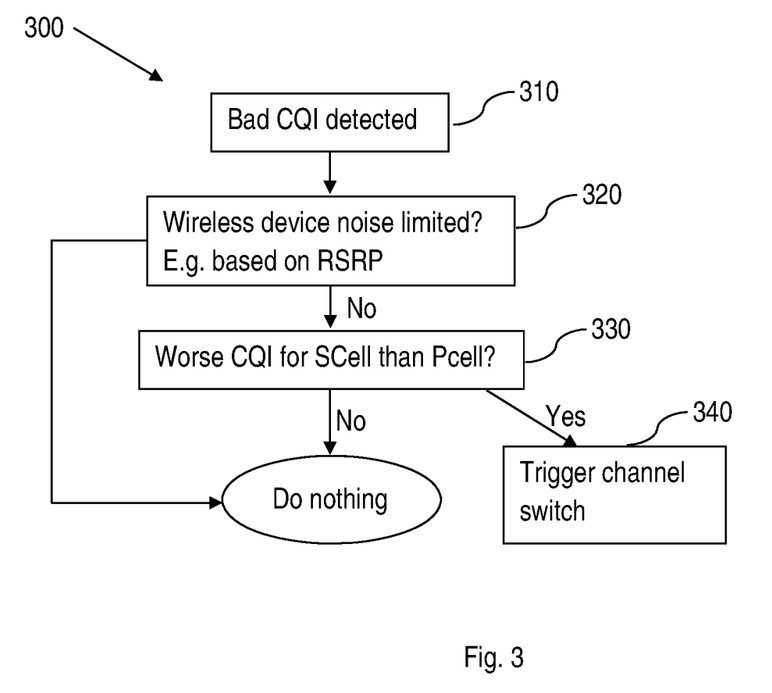
FIG. 3 is an illustrative flowchart of the method performed by the network node in an exemplifying embodiment.

FIG. 3 is an illustrative flowchart of the method 300 performed by the network node in an exemplifying embodiment. When a wireless device experiences bad channel quality 310, e.g. CQI, it can be due to different reasons, but the result is that throughput may be low. The network node may determine if the bad CQI depends on the physical environments or due to unwanted/unmanaged interference 320. If the problem is due to the physical environments not much can be done since the wireless device is most likely out of coverage and should be understood from the signal strength measurements, RSRP. However, there are several situations in which the RSRP may be good but the CQI is still bad.

Situations with CQI worse than expected can be detected in different ways:
  Comparing CQI between PCell and SCell 330. Much larger CQI on PCell than on SCell indicates that the channel on the SCell experiences more interference, as long as the channel of the SCell is not noise limited, which will happen first on the channel of the SCell due to lower output power and higher frequency.
  Instead of CQI for PCell, the geometry for PCell or SCell may be used.
  If geometry for PCell is used, not all the neighbouring cells might be considered in the geometry. The reason for this is that not all cells support SCells (e.g. a big macro cell have the support to run a low power cell by design, coverage difference is too large).

Another reason is that not all SCells are using the same frequencies, hence only the cells using the same SCell as own cell should be included.
  Based on RSRP measurements in either the PCell or SCell, the pathloss for the SCell may be estimated and an estimation of what CQI should be achievable if no interference exists may be performed.

When the wireless device detects and reports bad channel quality, e.g. CQI, the network node should check if the reason is due to bad coverage or that the interference are similar to PCell (e.g. bad CQI is likely due to LTE-U interfering with itself). If none of the reasons explain bad CQI, then the network node triggers channel switch 340.

Embodiments herein also relate to a network node for communicating with a wireless device. Exemplifying embodiments of such a network node will now be described with reference to FIGS. 4 and 5. The network node, supports carrier aggregation, and is operable in a first communication network and provides a PCell in a licensed frequency band and a SCell in an unlicensed frequency band. In this disclosure, a PCell may also be referred to as a primary carrier and a SCell may be referred to as a secondary carrier.

Figure 4:
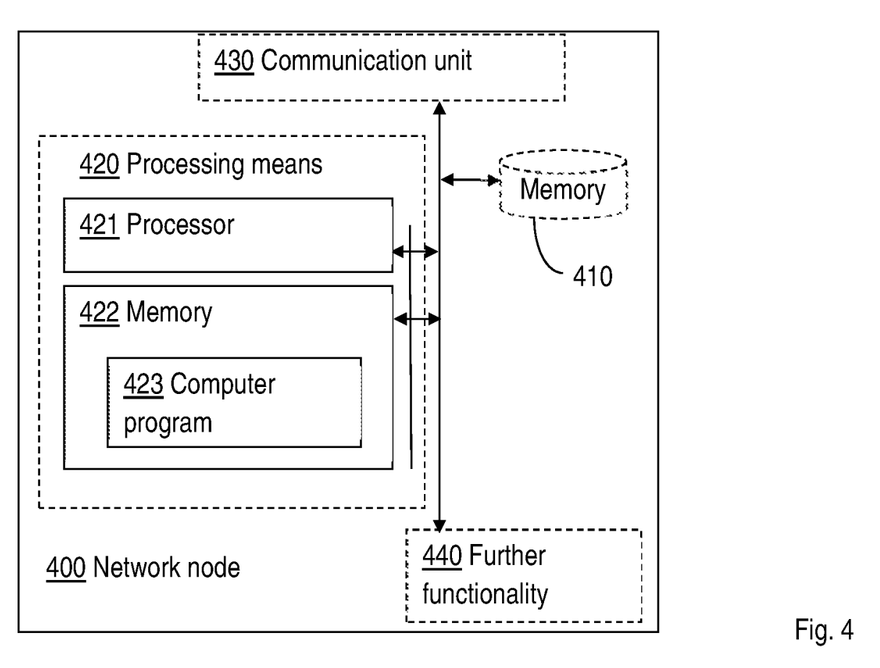
FIG. 4 is a block diagram of a network node for communicating a wireless device, according to an exemplifying embodiment.
Figure 5:
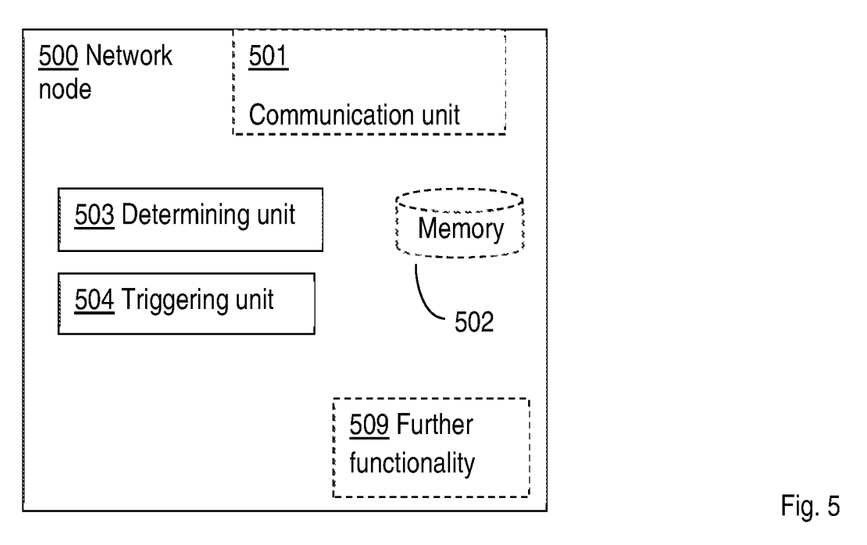
FIG. 5 is a block diagram of a network node for communicating a wireless device, according to yet an exemplifying embodiment.

FIGS. 4 and 5 illustrate the network node 400, 500 being configured for determining that a channel quality for the channel of the SCell does not meet a predetermined threshold; and when the channel quality for the SCell not meeting the predetermined threshold is due to interference from devices and/or nodes not belonging to the first communication network, triggering a channel switch of the SCell.

The network node 400, 500 may be implemented or realised in different ways. An exemplifying implementation is illustrated in FIG. 4. FIG. 4 illustrates the network node 400 comprising a processor 421 and memory 422, the memory comprising instructions, e.g. by means of a computer program 423, which when executed by the processor 421 causes the network node 400 to determine that a channel quality for the channel of the SCell does not meet a predetermined threshold; and to, when the channel quality for the channel of the SCell not meeting the predetermined threshold is due to interference from devices or nodes not belonging to the first communication network, trigger a channel switch of the SCell.

FIG. 4 also illustrates the network node 400 comprising a memory 410. It shall be pointed out that FIG. 4 is merely an exemplifying illustration and memory 410 may optionally, be a part of the memory 422 or be a further memory of the network node 400 operable in a communication network. The memory may for example comprise information relating to the network node 400, to statistics of operation of the network node 400, just to give a couple of illustrating examples. FIG. 4 further illustrates the network node 400 comprising processing means 420, which comprises the memory 422 and the processor 421. Still further, FIG. 4 illustrates the network node 400 comprising a communication unit 430. The communication unit 430 may comprise an interface through which the network node 400 communicates with other nodes, servers, wireless devices or entities of the communication network. FIG. 4 also illustrates the network node 400 comprising further functionality 440. The further functionality 440 may comprise hardware of software necessary for the network node 400 to perform different tasks that are not disclosed herein.

An alternative exemplifying implementation of the network node 400, 500 is illustrated in FIG. 5. FIG. 5 illustrates the network node 500 comprising a determining unit 503 for determining that a channel quality for the channel of the SCell does not meet a predetermined threshold. FIG. 5 also illustrates the network node 500 comprising a triggering unit 504 for when the channel quality for the channel of the SCell not meeting the predetermined threshold is due to interference from devices or nodes not belonging to the first communication network, triggering a channel switch of the SCell.

In FIG. 5, the network node 500 operable in a communication network is also illustrated comprising a communication unit 501. Through this unit, the network node 500 is adapted to communicate with other nodes and/or entities in the communication network. The communication unit 501 may comprise more than one receiving arrangement. For example, the communication unit may be connected to both a wire and an antenna, by means of which the network node 500 is enabled to communicate with other nodes and/or entities in the communication network. Similarly, the communication unit 501 may comprise more than one transmitting arrangement, which in turn are connected to both a wire and an antenna, by means of which the network node 500 is enabled to communicate with other nodes and/or entities in the communication network. The network node 500 further comprises a memory 502 for storing data. Further, the network node 500 may comprise a control or processing unit (not shown) which in turn is connected to the different units 503-504. It shall be pointed out that this is merely an illustrative example and the network node 500 may comprise more, less or other units or modules 509 which execute the functions of the network node 500 in the same manner as the units illustrated in FIG. 5.

It should be noted that FIG. 5 merely illustrates various functional units in the network node 500 in a logical sense. The functions in practice may be implemented using any suitable software and hardware means/circuits etc. Thus, the embodiments are generally not limited to the shown structures of the network node 500 and the functional units. Hence, the previously described exemplary embodiments may be realised in many ways. For example, one embodiment includes a computer-readable medium having instructions stored thereon that are executable by the control or processing unit for executing the method steps in the network node 500. The instructions executable by the computing system and stored on the computer-readable medium perform the method steps of the network node 500 as set forth in the claims.

The network node has the same possible advantages as the method performed by the network node. One possible advantage is that interference may be avoided or reduced. Another possible advantage is that throughput may be increased. Higher throughput may enable new services or shorten the completion time. Still another possible advantage is that a more aggressive MCS may be used, wherein less overhead is needed in order to successfully transmit on the channel of the SCell. A further advantage due to less overhead and shorter completion time is that the system may switch to low power mode for longer time and save energy. A further possible advantage is that the other wireless devices directly or indirectly causing the interference situation may experience less interference themselves as the frequency (channel) is changed for communication between the network node and wireless device. Additionally, since bad interference situation may be detected and resolved or at least lessened, it is not only the performance that may be improved for the use of mixed technologies on unlicensed spectrum, but also the ability to co-exist. This further makes it easier manage the systems where no common deployment or frequency planning exist.

According to an embodiment, the network node 400, 500 is further configured for receiving information about channel quality for the channel of the SCell from the wireless device.

According to yet an embodiment, the information about channel quality for the channel of the SCell comprises a CQI for the channel of the SCell.

According to an embodiment, the network node 400, 500 is further configured for determining whether the reason for the channel quality for the channel of the SCell not meeting the predetermined threshold is due to interference or physical constraints.

According to still an embodiment, the physical constraints are associated with poor radio coverage.

According to another embodiment, the network node 400, 500 is further configured for determining the type of interference, i.e. whether the channel quality for the channel of the SCell not meeting the predetermined threshold is due to interference from devices or nodes not belonging to the first communication network or due to internal interference.

According to a further embodiment, the network node 400, 500 is further configured for determining the type of interference by calculating the geometry for the PCell or SCell(s) and converting it to a channel quality which is compared to the received information about channel quality for the channel of the SCell.

According to an embodiment, the PCell(s) or SCell(s) used to calculate the geometry is limited to cells associated with neighbouring network nodes supporting or having an activated SCell on the same SCell-frequency as the network node performing the method According to yet an embodiment, the network node 400, 500 is configured for determining the type of interference by comparing the channel quality for the channel of the SCell to a channel quality of the PCell.

According to still an embodiment, the network node 400, 500 is configured for determining the type of interference by comparing the channel quality for the channel of the SCell to an estimated channel quality based on what can be achieved from a Reference Signal Received Power, RSRP, if no interference exists, associated with the SCell.

According to another embodiment, the network node 400, 500 is configured for determining the type of interference by estimating a pathloss for the channel of the SCell and estimating an achievable CQI if no interference exists and comparing it to the channel quality of the SCell.

According to a further embodiment, the network node 400, 500 is further configured for starting a timer when a new channel is selected for the SCell, and when the timer lapses, determining whether a channel quality for the newly selected channel for the SCell does not meet a predetermined threshold.

According to an embodiment, the network node 400, 500 is further configured for performing a transmission to the wireless device using the SCell.

Figure 6:
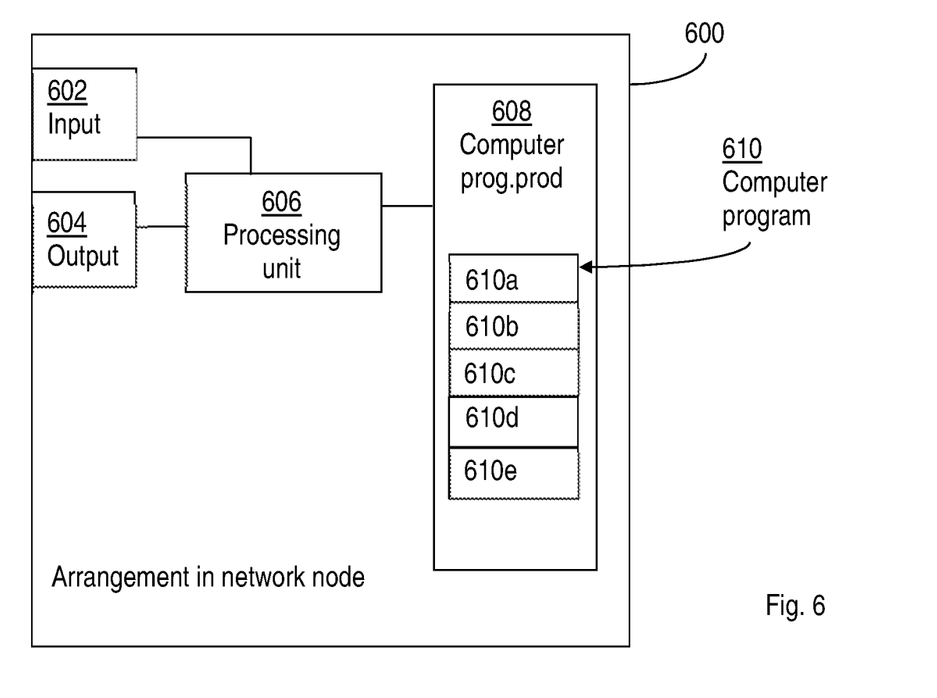
FIG. 6 is a block diagram of an arrangement in a network node for communicating a wireless device, according to an exemplifying embodiment.

FIG. 6 schematically shows an embodiment of an arrangement 600 in a network node 500 operable in a first communication network. Comprised in the arrangement 600 in the network node 500 are here a processing unit 606, e.g. with a DSP. The processing unit 606 may be a single unit or a plurality of units to perform different actions of procedures described herein. The arrangement 600 in the network node 500 may also comprise an input unit 602 for receiving signals from other entities, and an output unit 604 for providing signal(s) to other entities. The input unit and the output unit may be arranged as an integrated entity or as illustrated in the example of FIG. 5, as one or more interfaces 501.

Furthermore, the arrangement 600 in the network node 500 comprises at least one computer program product 608 in the form of a non-volatile memory, e.g. an EEPROM, a flash memory and a hard drive. The computer program product 608 comprises a computer program 610, which comprises code means, which when executed in the processing unit 606 in the arrangement 600 in the network node 500 in the communication network causes the network node 500 to perform the actions e.g. of the procedure described earlier in conjunction with FIGS. 1a-1e.

The computer program 610 may be configured as a computer program code structured in computer program modules 610a-610e. Hence, in an exemplifying embodiment, the code means in the computer program of the arrangement 600 in the network node 500 comprises a determining unit, or module, for determining that a channel quality for the SCell does not meet a predetermined threshold. The computer program further comprises a triggering unit, or module, for triggering a channel switch of the SCell when the channel quality for the SCell not meeting the predetermined threshold is due to interference from devices and/or nodes not belonging to the first communication network.

The computer program modules could essentially perform the actions of the flow illustrated in FIGS. 1a-1e, to emulate the network node 500 operable in the communication network. In other words, when the different computer program modules are executed in the processing unit 606, they may correspond to the units 503-504 of FIG. 5.

Although the code means in the respective embodiments disclosed above in conjunction with FIG. 5 is implemented as computer program modules which when executed in the processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the embodiments of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node supporting carrier aggregation, for communicating with a wireless device, the network node being operable in a first communication network, wherein the network node provides a Primary Cell (PCell) in a licensed frequency band and a Secondary Cell (SCell) in an unlicensed frequency band, the method comprising:
determining that a channel quality for a channel of the SCell is below a channel quality for a channel of the PCell;
determining that the channel quality for the channel of the SCell being below the channel quality for the channel of the PCell is due to interference from devices or nodes belonging to one or more communication networks other than the first communication network,
wherein the determining that the channel quality for the channel of the SCell being below the channel quality for the channel of the PCell is due to the interference from the devices or nodes belonging to the one or more communication networks other than the first communication network comprises calculating a geometry for PCell(s) or SCell(s), and converting the calculated geometry to a channel quality which is compared to the channel quality for the channel of the SCell, and
wherein the PCell(s) or the SCell(s) used to calculate the geometry are limited to cells associated with neighbouring network nodes supporting or having an activated SCell on a same SCell-frequency as the network node performing the method;
triggering a channel switch of the SCell from a first channel of the SCell to a second channel of the SCell; and
starting a timer when a new channel is selected for the SCell, and when the timer lapses, determining whether a channel quality for the newly selected channel for the SCell is below a predetermined threshold.

2. The method according to claim 1, further comprising receiving information about the channel quality for the channel of the SCell from the wireless device.

3. The method according to claim 2, wherein the information about the channel quality for the channel of the SCell comprises a Channel Quality Indicator (CQI) for the channel of the SCell.

4. The method according to claim 1, further comprising determining that the channel quality for the channel of the SCell being below the channel quality for the channel of the PCell is due to physical constraints.

5. The method according to claim 4, wherein the physical constraints are associated with poor radio coverage.

6. The method according to claim 1, further comprising determining that the channel quality for the channel of the SCell being below the channel quality for the channel of the PCell is due to internal interference.

7. The method according to claim 1, wherein the determining that the channel quality for the channel of the SCell being below the channel quality for the channel of the PCell is due to the interference from the devices or nodes belonging to the one or more communication networks other than the first communication network comprises comparing the channel quality for the SCell to an estimated channel quality based on what can be achieved based on Reference Signal Received Power (RSRP) if no interference exists, associated with the SCell.

8. The method according to claim 3, wherein the determining that the channel quality for the channel of the SCell being below the channel quality for the channel of the PCell is due to the interference from the devices or nodes belonging to the one or more communication networks other than the first communication network comprises estimating a pathloss for the SCell and estimating an achievable CQI if no interference exists, and comparing the estimated achievable CQI to the CQI for the channel the SCell.

9. The method according to claim 1, further comprising performing a transmission to the wireless device using the channel of the SCell.

10. A network node supporting carrier aggregation, operable for communicating with a wireless device, wherein the network node is operable in a first communication network and provides a Primary Cell (PCell) in a licensed frequency band and a Secondary Cell (SCell) in an unlicensed frequency band, the network node being configured to:
    determine that a channel quality for a channel of the SCell is below a channel quality for a channel of the PCell;
    determine that the channel quality for the channel of the SCell being below the channel quality for the channel of the PCell is due to interference from devices or nodes of other radio access technologies belonging to one or more communication networks other than the first communication network;
    determine that the channel quality for the channel of the SCell being below the channel quality for the channel of the PCell is due to the interference from the devices or nodes belonging to the one or more communication networks other than the first communication network by calculating a geometry for the PCell(s) or SCell(s), and converting the calculated geometry to a channel quality which is compared to the channel quality for the channel of the SCell,
        wherein the PCell(s) or the SCell(s) used to calculate the geometry are limited to cells associated with neighbouring network nodes supporting or having an activated SCell on a same SCell-frequency as the network node;
    triggering a channel switch of the SCell from a first channel of the SCell to a second channel of the SCell; and
    start a timer when a new channel is selected for the SCell, and when the timer lapses, to determine whether a channel quality for the newly selected channel for the SCell is below a predetermined threshold.

11. The network node according to claim 10, further being configured to receive information about the channel quality for the channel of the SCell from the wireless device.

12. The network node according to claim 11, wherein the information about the channel quality for the channel of the SCell comprises a Channel Quality Indicator (CQI) for the channel of the SCell.

13. The network node according to claim 10, further being configured to determine that the channel quality for the channel of the SCell being below the channel quality for the channel of the PCell is due to physical constraints.

14. The network node according to claim 13, wherein the physical constraints are associated with poor radio coverage.

15. The network node according to claim 10, further being configured to determine that the channel quality for the channel of the SCell being below the channel quality for the channel of the PCell is due to internal interference.

16. The network node according to claim 10, further being configured to determine that the channel quality for the channel of the SCell being below the channel quality for the channel of the PCell is due to the interference from the devices or nodes belonging to the one or more communication networks other than the first communication network by comparing the channel quality for the SCell to an estimated channel quality based on what can be achieved from a Reference Signal Received Power (RSRP) if no interference exists, associated with the SCell.

17. The network node according to claim 12, further being configured to determine that the channel quality for the channel of the SCell being below the channel quality for the channel of the PCell is due to the interference from the devices or nodes belonging to the one or more communication networks other than the first communication network by estimating a pathloss for the SCell and estimating an achievable CQI if no interference exists, and comparing the estimated achievable CQI to the CQI for the channel of the SCell.

18. The network node according to claim 10, further being configured to transmit to the wireless device using the channel of the SCell.

19. A non-transitory computer program product storing a computer program comprising instructions which when run in a processing unit comprised in an arrangement in a network node supporting carrier aggregation, for communicating with a wireless device, the network node being operable in a first communication network, wherein the network node provides a Primary Cell (PCell) in a licensed frequency band and a Secondary Cell (SCell) in an unlicensed frequency band, cause the network node to perform a method comprising:
    determining that a channel quality for a channel of the SCell is below a channel quality for a channel of the PCell;
    determining that the channel quality for the channel of the SCell being below the channel quality for the channel of the PCell is due to interference from devices or nodes belonging to one or more communication networks other than the first communication network;
    determining that the channel quality for the channel of the SCell being below the channel quality for the channel of the PCell is due to the interference from the devices or nodes belonging to the one or more communication networks other than the first communication network by calculating a geometry for the PCell(s) or SCell(s), and converting the calculated geometry to a channel quality which is compared to the channel quality for the channel of the SCell,
        wherein the PCell(s) or the SCell(s) used to calculate the geometry are limited to cells associated with neighbouring network nodes supporting or having an activated SCell on a same SCell-frequency as the network node performing the method;
    triggering a channel switch of the SCell from a first channel of the SCell to a second channel of the SCell; and
    starting a timer when a new channel is selected for the SCell, and when the timer lapses, determining whether a channel quality for the newly selected channel for the SCell is below a predetermined threshold.

* * * * *